May 16, 1961 W. E. MEISSNER 2,984,058
METHOD AND APPARATUS FOR FILM SEALING
Filed Sept. 29, 1959 2 Sheets-Sheet 1
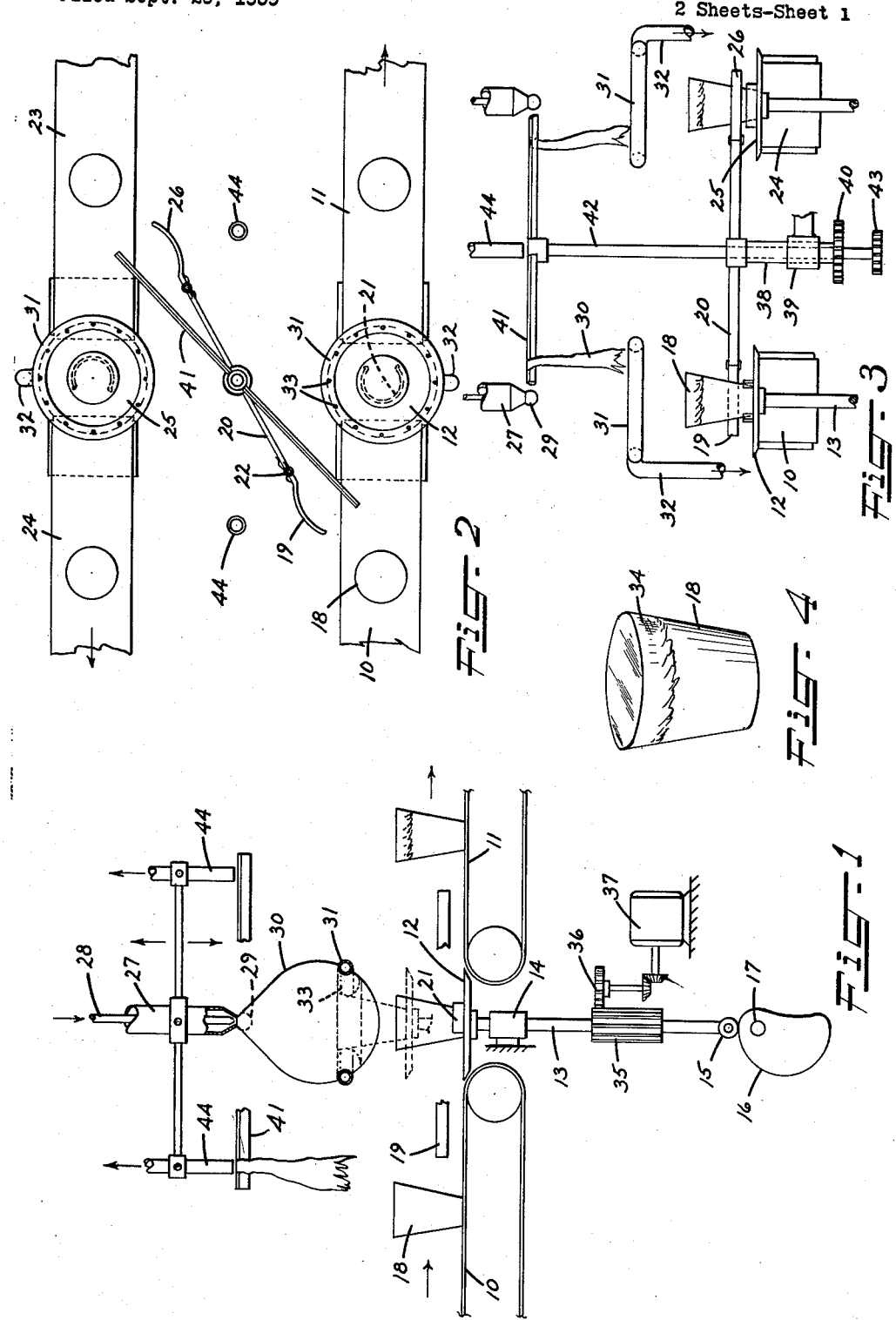

May 16, 1961 W. E. MEISSNER 2,984,058
METHOD AND APPARATUS FOR FILM SEALING
Filed Sept. 29, 1959 2 Sheets-Sheet 2

United States Patent Office 2,984,058
Patented May 16, 1961

2,984,058

METHOD AND APPARATUS FOR FILM SEALING

William E. Meissner, Devon, Pa., assignor to American Viscose Corporation, Philadelphia, Pa., a corporation of Delaware Filed Sept. 29, 1959, Ser. No. 843,226

16 Claims. (Cl. 53—42)

This invention relates to an improved method and apparatus for providing a plastic film over a container to which other closing means may or may not have been previously applied.

It is an object of this invention to provide a method for concomitantly or substantially concomitantly forming a plastic film and applying it to a container or carrier to be sealed.

It is a further object of the invention to provide an apparatus for applying a newly formed plastic film as a tamper-proof sealing closure for an open-ended container or for applying such newly formed film as a sealing coating over the end of a container to which a principal cap, stopper or other closing means has been previously applied.

A still further object of the invention is to provide an improved method of sealing variously shaped containers or carriers with a plastic film.

A more specific object of the invention is to provide a method and apparatus for producing a film in the form of a bubble and causing the bubble to envelop the end of the container to be sealed and then rupturing the bubble whereby a portion of the material of which it is formed adheres to the container.

Other and further objects, features and advantages of the invention will become apparent as the description of certain preferred embodiments thereof proceeds.

In one form of the method of the present invention a mass of tacky film-forming material is inflated to form a sticky plastic bubble and the open end of an open-ended container which has previously been filled is brought into contact with the bubble so as to depress the surface of the bubble whereby the bubble droops over and contacts that portion of the container adjacent the open end and adheres thereto due to the tacky nature of the bubble-forming material. The bubble and container are then rotated relative to one another whereby the bubble is twisted and ruptured leaving a portion of it in sealing engagement with the end of the container. In bringing about the contact between the container and the bubble it is sometimes advantageous to move the container toward the bubble and at other times it will be found expedient to move the bubble while maintaining the container stationary. Under certain circumstances both the container and the sticky plastic mass which is to be inflated to form the bubble are maintained stationary but are so positioned in relation to one another that the bubble envelops the top of the container as it is being inflated.

In another embodiment of the invention, a plastic bubble is formed within the confines of a ring and as the bubble reaches a diameter such that it touches the entire inner periphery of the ring it is punctured at a point of contact with the ring and the inflating medium is withdrawn or allowed to escape from the bubble, thus leaving a double film of plastic material supported by and across the ring. The container to be capped is then brought into contact with the double layer of film while the film is still newly formed and tacky so that the film then adheres to both the container and the ring. Then when the container and film supporting ring are relatively rotated about the axis of the ring, the film is twisted into tight contact with the container and ruptured so as to leave a sealing film over the end of the container.

The bubble itself is formed by providing a mass of plastic material on the end of a tube and blowing air or other gas which is non-reactive with the plastic material through the tube so as to inflate the mass and form a thin walled bubble which will adhere to the article to be sealed when it comes in contact therewith and which can be broken or ruptured by relatively rotating the bubble and the article. The bubble may be formed of a wide variety of materials, the particular material for any given application depending upon the nature of the article to be sealed or the contents of the container to be closed. Preferred types include the synthetic linear polymers of thermoplastic character and the elastomeric types. Examples include vinyl resins, such as saran, polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester or nylon (polyamide) type, polyvinyl butyral, polyvinyl alcohols, polyvinyl ethers; elastomeric types may include neoprene, rubber hydrochloride, polymers of chloroprene, copolymers of butadiene with styrene or acrylonitrile, polyisobutylene, and so forth. It is to be understood that the mentioning of these particular materials is not intended to limit the invention thereto but merely to illustrate the wide variety of film-forming materials that can be used in carrying out the invention. Of course, the selection of any particular material depends upon the character of the article to be packaged. Thus, polyvinyl acetate, polyvinyl acetals and polyvinyl alcohols and neoprene, especially the latter two types, are highly advantageous when the container to be sealed contains an oil, especially of the hydrocarbon type. Polyvinyl acetate, polyvinyl chloride, related copolymers of these two monomers, and polyethylene are particularly adaptable for sealing packages containing aqueous liquids.

For forming the bubble, a commercially feasible apparatus comprises a pair of coaxially arranged tubes, the outer of which tapers inwardly at the end to provide a relatively small orifice located in proximity to the end of the inner tube. The film-forming material is fed through the outer tube in an intermittent manner so as to periodically form a plastic mass or drip at the end of the outer tube and which is expanded or inflated by blowing air or other gas, which in some cases may be heated, through the inner of the coaxial tubes. Preferably, the film-forming material is converted from its normal powder or pellet form into a highly viscous liquid before being introduced into the tube. This conversion may be accomplished by the incorporation of plasticizers or solvents capable of dissolving or dispersing the powder or pellets. In the case of thermoplastic materials, the resin may be liquefied by means of heat and under certain circumstances the temperature at which the pellets or powder becomes liquid may be lowered by the incorporation of a plasticizer either of solid or liquid character. If the film is to be used to cap an open-topped container containing a liquid, the plasticizer or solvent should be of the type which is insoluble in the liquid which is in the container. Volatile solvents may be employed for dissolving or dispersing the film-forming material so that the bubble may be formed at room temperature. Known solvents and plasticizers may be employed, the selection depending upon the particular film-forming material to be used. Thus acetone or dioxane may be used for vinyl acetate or copolymers of vinyl acetate or vinyl chloride or acrylonitrile. The concentration of the film-forming material is preferably as great as possible, the concentration being limited only by the necessity that the plastic mass at the end of the bubble-forming mechanism be capable of being inflated. The lower limit of concentration is determined by the necessity of providing a reasonably viscous coherent plastic mass which will not fall away from the end of the coaxial tubes due to its own weight.

Referring now to the drawing for a description of certain preferred forms of apparatus:

Figure 1 is a side elevational view of a form of apparatus capable of assembly line operation;

Figure 2 is a plan view of the apparatus;

Figure 3 is an end view;

Figure 4 shows a cup-like container which has been capped in accordance with the invention;

Figure 6:
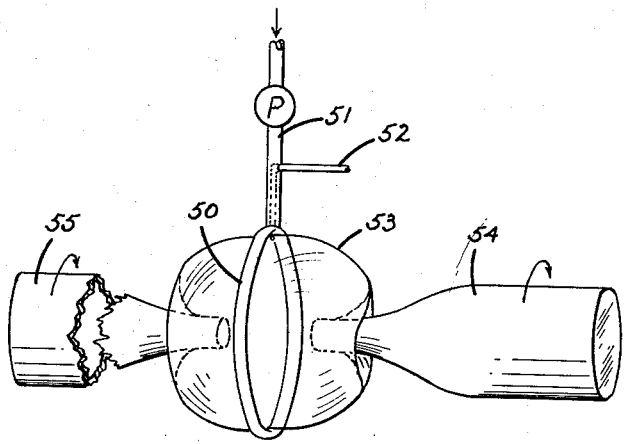
Figure 6 is a diagrammatic perspective view showing the simultaneous sealing of two bottle type containers.

Referring first to Figures 1, 2 and 3; in order to provide for assembly line operation, means are provided for delivering the object to be capped to the capping station and for removing it from the capping station upon completion of the capping operation. As shown in the drawing, this means comprises a pair of endless belts 10 and 11 spaced from one another and travelling in the same direction. Located between the two belts is a turntable 12 secured to the upper end of a shaft 13 which is rotatably and slidably mounted in a bearing 14. Rotatably mounted on the lower end of shaft 13 on an axis perpendicular to the longitudinal axis of the shaft is a cam following roller 15 which rests upon an irregularly shaped cam 16 rotatable or oscillatable about a shaft 17. For purposes of illustration, the container being capped is shown as a cup 18 which may be of small size and contain cream to be served with individual orders in a restaurant or the like. The containers may be filled by known forms of automatic machinery and loaded, also automatically, on the upper course of the travelling belt 10.

As the container approaches the end of the belt, it is contacted by the curved end 19 of an arm 20 mounted for rotation in a plane parallel to and slightly above the plane of the upper course of belt 10. The end of the arm 20 as it sweeps into contact with the container slides the container from the belt onto the turntable 12 and into gripping engagement with a U-shaped spring clip 21 which is secured to the turntable. The belt 10 is preferably formed of polished stainless steel or of a fabric having a smooth resin coated surface to permit the container to slide easily without danger of being tipped over. Also, to facilitate the transfer from the belt to the turntable, the edge of the turntable is tapered as shown in the drawing to permit close spacing of the belt and table while maintaining both at the same elevation. In order to permit continuous rotation of the arm 20, a spring hinge 22 is provided between the end 19 and the main portion of the arm so that when the cup becomes engaged with the clip 21 the hinge 22 yields to permit the end 19 to momentarily fold back out of the way as the arm 22 moves past the cup.

To provide for increased capacity, a second pair of belts 23 and 24 is mounted parallel to the belts 10 and 11 and moved in the opopsite direction from that of the belts 10 and 11. A turntable 25 is mounted between these latter two belts in a manner similar to that of the turntable 12 and the sweep arm 20 has a second hinged end 26 at the end opposite from the end 19 so that containers may be simultaneously moved onto the two turntables if desired.

After a cup has been capped in the manner presently to be explained, it is contacted by one of the ends 19 or 26 and forced out of the spring clip 21 and onto the discharge belt 11 or the belt 24 as the case may be. As will also presently be explained, the turntables are turned through 180° during each capping operation so that the cups are moved into and from the U-shaped clip through the open end of the clip.

A bubble forming apparatus comprising coaxial tubes 27 and 28 is located directly above the center of each of the turntables 12 and 25. The outer tube 27 is tapered inwardly at its lower end to provide a relatively small opening directly aligned with and in close proximity to the lower end of the inner tube 28. The liquefied film-forming material is supplied through the tube 27 and by periodically applying pressure to the material in the tube, masses of the material are forced through the restricted end thereof so as to adhere to the end of the tube. One such mass is indicated in Figure 1 at 29 and because of its tacky nature it not only adheres to the end of the tube 27 but is further supported by that portion of the material remaining in the tube. Air or other suitable gas is then forced through the tube 28 so as to inflate the plastic mass 29 and form a bubble 30.

A ring member 31 is located between the end of tube 27 and turntable 12 with its central axis aligned with the axes of the tube and turntable whereby as the bubble reaches its fully inflated condition it contacts and is confined by the ring member, as shown in Figure 1. Ring member 31 is formed of tubing and is supported cantilever style by the upper end of a pipe 32 as best shown in Figure 3, the bore of the pipe being in communication with the bore of the tubing forming the ring member. The ring member is coated with a silicone release agent so that the bubble-forming material will not adhere thereto. A series of openings 33 is provided around the inner periphery of the ring member and a negative pressure is periodically applied to the pipe 32 so that the bubble is held in contact with the ring member, for a purpose presently to be explained.

After the bubble is formed, the cam 16 forces the shaft 13 and turntable 12 upwardly to a position as shown in dotted lines in Figure 1 to thereby force the open end of the container into contact with the bubble and depress the surface of the bubble so that the tacky film of which the bubble is formed droops over and contacts the outer upper portion of the cup. This movement of the cup into the bubble stretches that portion of the bubble-forming film tight across the top of the cup. With the bubble now adhered to the upper portion of the cup and forming a seal over the open end thereof, the turntable is rotated through 180°. Prior to rotation of the turntable, suction is applied to the pipe 32 so that the bubble is held in contact with the ring member 31 even though, because of the silicone coating on the ring member, the bubble does not normally adhere thereto. Since the bubble is adhered to the cup because of the sticky or tacky nature of the newly formed film and is held in contact with the ring member by suction, the rotation of the cup causes the bubble to rupture and leaves a portion of it adhered to the cup and forming a closure as indicated at 34 in Figure 4.

For rotating the shaft 13 a wide gear 35 is fixed thereto and said gear meshes with a gear 36 intermittently operated by an electric motor 37. The wide gear 35 permits the up and down movement of the shaft 13 without interfering with the mesh of the gears 35 and 36. Upon completion of the bubble rupturing rotation of the turntable, the turntable is lowered to its starting position and due to its 180° rotation the clip 21 now faces the belt 11 as shown in Figure 2, whereby the cup may be removed by the end 19 or 26 of the arm 20 and moved out onto the belt 11 which then carries it away from the capping station. The function of the clip 21 is to grip the container so that it will rotate with the turntable and after the capped cup is moved onto the belt 11 the turntable is either rotated through an additional 180° or turned backwards for 180° in order to face the open end of the clip toward the belt 10 in position to receive the next cup. If desired, a label may be attached or imprinted on the container during its rotative movement. It will be appreciated that the speeds of the belts, the turntable and the rotating arm 20 are so synchronized as to permit a continuous operation of the machine. As shown in Figure 3, the arm 20 is secured to a sleeve 38 rotatable in a bearing 39 and rotated by a gear 40 secured to one end thereof. The gear 40 may be rotated from any suitable source of power.

As soon as the bubble is ruptured, the pipe 32 is shut off from the vacuum source to release the unused portion of the bubble from contact with the ring member 31 and leave it suspended from the tube 27. It is desirable that the portion adhered to the tube be removed before the mass of material to be used for forming the next bubble is forced from the end of the tube and for this purpose a sweep arm 41 is provided. As shown in Figure 3, the arm 41 is carried at the upper end of a shaft 42 which extends through the sleeve 38 and is rotated independently by means of a gear 43 secured to the lower end of said shaft. The sweep arm 41 wipes against the end of tube 27 so as to remove the dangling portion of the ruptured bubble. As the arm 41 moves around with the ruptured portion of the bubble loosely tacked thereto, it passes beneath a vacuum exhaust tube 44 which draws the broken bubble away. The sweep arm is coated with a silicone release agent so as to permit the film-forming material to be easily drawn away by the exhaust tube. Depending somewhat upon the particular film-forming material, these unused portions of the bubble may be collected and re-melted. With the apparatus as shown in the drawing there is a bubble-forming station above each of the turntables 12 and 25 and two exhaust tubes 44 are provided.

In operation it is possible to force from the tube 27 a mass 29 of the material of sufficient size as to form the entire bubble or, if desired, pressure may be maintained on the plastic material within the tube 27 so that more and more of the material is forced from the end of the tube during the time that the bubble is being blown. These methods of forming the bubble are fully described in applicant's prior Patent No. 2,872,766.

While the drawing illustrates an arrangement wherein the container is raised into contact with the bubble and the container is rotated while the bubble is maintained stationary, it is to be understood that the bubble-forming tubes 27 and 28 and the ring member 31 could be lowered to engage the bubble with the container and that the rupturing of the bubble could be accomplished by rotating the ring member rather than the container. In this case the turntables 12 and 25 would be eliminated and the containers would merely move along an intermittently operated belt beneath the nozzle. In some instances it will be found desirable to maintain both the bubble forming nozzle and the container stationary and in such proximity to one another that as the bubble is blown and increases in size it envelops the top of the container. With certain film-forming materials, the bubble will be ruptured with less than a 180° relative rotation between the bubble and the container but in the apparatus shown the 180° rotation of the container is convenient because of the position of the loading and unloading belts and the construction of the container-gripping clip 21. For accommodating the apparatus for use with containers of different sizes, particularly different heights, it is desirable that the initial position of the bubble-forming means be adjustable and the arrows in Figure 1 are intended to indicate this feature.

It is also contemplated that the above-described method may be practiced without any apparatus at all except the actual bubble-forming mechanism and in that case the container to be capped may be moved manually into contact with the bubble and then twisted until the bubble is ruptured or the container may be rested on a support and the bubble-forming nozzle moved toward the container. This manual carrying out of the method is particularly advantageous for use in establishments catering to the consumer and where the consumer may be in a position to view the operation. For example, it may be used for covering a frozen or other confection.

Figure 5:
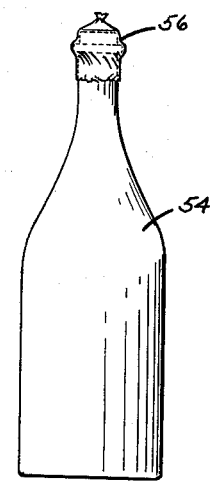
Figure 5 shows a bottle capped or sealed in accordance with the invention.

Figure 6 illustrates an embodiment of the invention which is particularly adaptable for capping two containers at the same time. In this embodiment a ring member 50 is connected to the end of a tube 51 through which the plastic bubble-forming material is pumped. The ring member has an opening aligned with the lower end of tube 51 whereby a mass of the plastic material may be forced into the confines of the ring member. The inflating medium is introduced through a small tube 52, a portion of which is coaxial with the tube 51 and located within said tube. As the inflating medium is blown through the tube 52 the plastic mass is inflated to form a bubble 53 which is blown to such a size as to be contacted all the way around by the ring member. Ordinarily this form of the invention is most advantageously applicable to providing a secondary tamper-proof closure to a container to which a primary closing element such as a stopper has been previously applied and in the drawing the containers are illustrated as bottles 54 and 55. The bottles are pressed against the bubble 53 toward the central axis of the ring member 50 whereby the plastic bubble-forming material envelops the top of the bottle and because of the tacky nature of the film it adheres to the bottle. When the bottles are then rotated the plastic is twisted and the bubble is ruptured leaving a double layer of film about the top of the bottle as illustrated in Figure 5 at 56, the outer layer of film being twisted so as to form a tight seal. This form of twisted film closure may sometimes be best obtained by moving the bottle in the direction away from the ring member before twisting. This results in a smooth layer of film about the top of the bottle due to the film adhering thereto as the bottle is moved toward the ring and a second layer which readily twists tightly together as illustrated in Figure 5.

Figure 7:
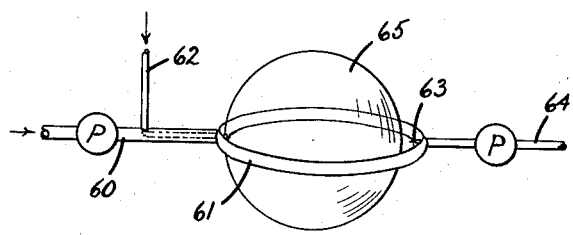
Figure 7 is a perspective view of another embodiment of the invention.
Figure 8:
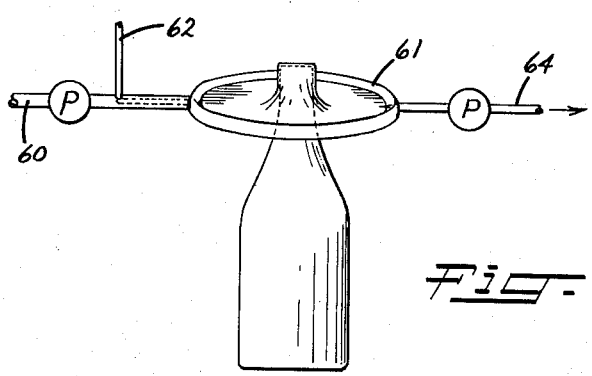
Figure 8 shows a method of applying a double layer of film to a container.

Another manner of providing a double layer film over the end of the container is illustrated in Figures 7 and 8. In this form of the invention the plastic material for forming the bubble is supplied through a tube 60 to the end of which a ring member 61 is connected with the open end of the tube extending through the ring and opening in the inner periphery thereof. The bubble inflating medium is introduced through a tube 62 a portion of which is coaxial with and internal of the tube 60. At a point on the ring 61 diametrically opposite the tube 60 a hollow needle 63 is provided, said needle being connected with or being integral with a tube 64. When the bubble 65 is inflated to a size which completely fills the interior of the ring member 61 the bubble contacts the point of the needle 63 and is thereby punctured. The inflating medium is withdrawn from the bubble through the hollow needle and the tube 64, thereby leaving a double layer of film supported by the ring member. The container to be capped is then moved into engagement with the double layer of film formed by the deflated bubble as illustrated in Figure 8 and upon twisting of the container about its axis the film is broken and twisted into sealing engagement with the end of the container.

Although not illustrated in the drawing, the invention may be practiced by dipping a ring into a solution of the plastic material whereby a film is formed across the ring due to the surface tension of the plastic as the ring is withdrawn from the solution. The container to be capped may then be brought into contact with this newly formed ring supported film and upon relative rotation between the container and ring the film is broken and twisted into sealing relation with the container.

Having thus described certain preferred forms of the invention, what is claimed is:

1. The method of capping a container including the steps of forming a bubble of a tacky film-forming material, bringing the bubble and that portion of the container to be capped into contact with one another so that the tacky material forming the bubble adheres to the container, and relatively rotating the bubble and container so as to rupture the bubble.

2. The method of capping and sealing an open-ended container comprising forming a mass of tacky film-forming material in an area adjacent the open end of a container to be capped, inflating the mass of material to form a bubble which surrounds the open end of the container, and relatively rotating the bubble and container so as to rupture the bubble.

3. The method of capping and sealing a container including the steps of forming a bubble of a tacky film-forming material, bringing the bubble and the open end of the container into contact, and bringing about a relative rotation between the bubble and the open end of the container so as to rupture the bubble and leave a film over the open end of the container.

4. The method of capping and sealing an open-ended container including the steps of forming a bubble of a tacky film-forming material, moving the open end of the container into contact with the bubble so as to depress the surface of the bubble and cause the bubble to contact that portion of the container adjacent the open end to which it will adhere due to its tacky nature, and relatively rotating the bubble and container to thereby rupture the bubble.

5. The method of capping and sealing an open-ended container including the steps of forming a bubble of a tacky film-forming material, moving the open end of the container into contact with the bubble so as to depress the surface of the bubble and cause the bubble to contact that portion of the container adjacent the open end to which it will adhere due to its tacky nature, and rotating the container about an axis normal to the plane of contact between the bubble and the open end of the container whereby the bubble is ruptured and a portion thereof adheres to and seals the container.

6. The method of applying a newly formed film to an article including the steps of forming a bubble of a tacky film-forming material, depressing the surface of the bubble with the article to which the film is to be applied whereby the depressed portion of the bubble adheres to the article due to its tacky nature, and twisting the bubble until it ruptures and leaves the portion thereof in contact with the article adhering to the article.

7. The method of applying a newly formed film to an article including the steps of forming a mass of tacky film-forming material, inflating the mass of material to form a bubble, bringing the bubble and the article to which the film is to be applied into contact with one another in a manner whereby the article depresses the surface of the bubble and the depressed portion of the bubble adheres to the article due to its tacky nature, and bringing about relative rotation between the bubble and article to rupture the bubble and leave a portion thereof adhering to the article.

8. Apparatus for sealing an open-ended container comprising bubble-forming means for forming a bubble of a tacky film-forming material, supporting means for supporting an open-ended container with its open end in alignment with said bubble-forming means, means for producing relative movement toward one another between the bubble formed by said bubble-forming means and said supporting means whereby the bubble is brought into contact with the open end of the container and adheres thereto due to its tacky nautre, and means for producing relative rotation between said bubble-forming means and the container whereby the portion of the bubble adhering to the container is broken away from the remainder of the bubble and forms a closure for the container.

9. Apparatus for providing a plastic film around an article comprising bubble-forming means for forming a bubble of a tacky film-forming material, supporting means for supporting an article in alignment with said bubble-forming means, means for producing relative movement toward one another between said bubble-forming means and said supporting means whereby the bubble is brought into contact with the article and adheres thereto due to its tacky nature, and means for producing relative rotation between said bubble-forming means and the article whereby the portion of the bubble adhering to the article is broken away from the remainder of the bubble.

10. Apparatus for sealing an open-ended container comprising bubble-forming means for forming a bubble of a tacky film-forming material, supporting means for supporting an open-ended container with its open end in alignment with said bubble-forming means, means for producing relative movement toward one another between said bubble-forming means and said supporting means whereby the bubble is brought into contact with the open end of the container and adheres thereto due to its tacky nature, means for producing relative rotation between said bubble-forming means and the container whereby the portion of the bubble adhering to the container is broken away from the remainder of the bubble and forms a closure for the container, and means for removing the remainder of the bubble from the bubble-forming means.

11. Apparatus for applying a newly formed film to an article comprising a film applying station, bubble-forming means for forming a bubble of a tacky film-forming material at said film applying station, means for conveying an article to said film applying station, means for producing relative movement toward one another between the bubble formed by said bubble-forming means and the article whereby the article depresses the surface of the bubble and the bubble adheres to the article due to its tacky nature, and means for producing relative rotation between the bubble and the article whereby that portion of the bubble adhering to the article is broken away from the remainder of the bubble.

12. Apparatus for applying a newly formed film to an article comprising a film applying station, bubble-forming means for forming a bubble of a tacky film-forming material at said film applying station, means for conveying an article to said film applying station, means for producing relative movement toward one another between the bubble formed by said bubble-forming means and the article whereby the article depresses the surface of the bubble and the bubble adheres to the article due to its tacky nature, means for producing relative rotation between the bubble and the article whereby that portion of the bubble adhering to the article is broken away from the remainder of the bubble, and means for conveying the article from the film applying station.

13. Apparatus for applying a newly formed film to an article comprising a film applying station, bubble-forming means for forming a bubble of a tacky film-forming material at said film applying station, means for conveying an article to said film applying station, means for producing relative movement toward one another between the bubble formed by said bubble-forming means and the article whereby the article depresses the surface of the bubble and the bubble adheres to the article due to its tacky nature, means for producing relative rotation between the bubble and the article whereby that portion of the bubble adhering to the article is broken away from the remainder of the bubble, means for removing the remainder of the bubble from the bubble-forming means, and means for conveying the article from the film applying station.

14. The method of capping a container including the steps of blowing a bubble of sticky plastic material inside a ring member, puncturing the bubble, withdrawing the bubble inflating medium from the bubble to provide a double layer of plastic film supported by the ring member, bringing the double layer of film and a container to be capped into contact with one another whereby the film adheres to the container, and relatively rotating the ring and container to break the film away from the ring and twist it about the container.

15. The method of capping a container including the steps of forming a bubble of a tacky film-forming material circumscribed by a ring member to which the bubble is adhered, simultaneously moving a pair of containers toward the axis of the ring member and into contact with the bubble on opposite sides of the ring member, and relatively rotating the containers and the ring member about the axis of the ring member to rupture the bubble whereby a portion of the material forming the bubble remains in capping engagement with each container.

16. The method of capping a container including the steps of supporting a newly formed, tacky plastic film by means of a ring, inserting the end of the article to be capped into the central opening of the ring and in contact with the tacky plastic film supported thereby whereby the film adheres to the end of the container, withdrawing the end of the container from the opening of the ring thereby providing a web of film over the end of the container and a web of film extending between the container and the ring, rotating the container about the axis of the ring to twist the web of film extending between the container and the ring about itself to provide a double layer of film over the end of the container.

References Cited in the file of this patent

UNITED STATES PATENTS

| | | |
|---|---|---|
| 2,485,372 | Farrell | Oct. 18, 1949 |
| 2,531,795 | Walter | Nov. 28, 1950 |